(12) United States Patent
Kobayashi et al.

(10) Patent No.: US 8,796,570 B2
(45) Date of Patent: Aug. 5, 2014

(54) INTERLOCK DEVICE OF DRAW-OUT TYPE CIRCUIT BREAKER, DRAW-OUT TYPE CIRCUIT BREAKER, AND POWER DISTRIBUTION BOARD

(75) Inventors: Masato Kobayashi, Hitachi (JP); Masato Suzuki, Itabashi (JP); Ayumu Morita, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 240 days.

(21) Appl. No.: 13/367,395

(22) Filed: Feb. 7, 2012

(65) Prior Publication Data

US 2012/0228096 A1    Sep. 13, 2012

(30) Foreign Application Priority Data

Mar. 9, 2011   (JP) .................................. 2011-50897

(51) Int. Cl.
| | | |
|---|---|---|
| *H01H 9/00* | (2006.01) | |
| *H02B 11/133* | (2006.01) | |
| *H02B 11/26* | (2006.01) | |
| *H01H 9/10* | (2006.01) | |
| *H01H 9/26* | (2006.01) | |
| *H01H 71/52* | (2006.01) | |
| *H01H 71/50* | (2006.01) | |

(52) U.S. Cl.
CPC .............. *H02B 11/133* (2013.01); *H02B 11/26* (2013.01); *H01H 9/10* (2013.01); *H01H 9/26* (2013.01); *H01H 71/52* (2013.01); *H01H 71/505* (2013.01)
USPC ...................................................... 200/50.22

(58) Field of Classification Search
CPC .... H02B 11/133; H02B 11/26; H02B 11/167; H02B 11/173; H02B 11/127; H01H 9/10; H01H 9/26; H01H 71/52; H01H 71/526; H01H 71/505
USPC ....................................................... 200/50.22
See application file for complete search history.

(56) References Cited

U.S. PATENT DOCUMENTS 2,673,260 A * 3/1954 Lester et al. ................ 200/50.26
4,449,021 A * 5/1984 Wakayama et al. ........... 218/119
(Continued)

FOREIGN PATENT DOCUMENTS

| EP | 1 416 503 A2 | 5/2004 |
| JP | 01-111436 | 7/1989 |

(Continued)

OTHER PUBLICATIONS

Office Action in corresponding Japanese Application 2011-050897, dated Apr. 23, 2013 with English language translation thereof.

*Primary Examiner* — Kyung Lee
(74) *Attorney, Agent, or Firm* — Antonelli, Terry, Stout & Kraus, LLP.

(57) ABSTRACT

An interlock device of a draw-out type circuit breaker, provided with a tripping button that is linked to a tripping mechanism of the draw-out type circuit breaker and an interlock rod that is placed so as to be movable up and down, and constructed so that the tripping button mechanically prevents an operation to raise the interlock rod unless the tripping button is operated to place the draw-out type circuit breaker in the open state, so a power distribution board floor surface or a member fixed on the power distribution board floor surface and the interlock rod interfere with each other, thereby the draw-out type circuit breaker is fixed at a prescribed position in a power distribution board.

7 Claims, 8 Drawing Sheets

(56) References Cited

U.S. PATENT DOCUMENTS

| | | | | |
|---|---|---|---|---|
| 4,713,501 A | * | 12/1987 | Herrmann | 200/50.22 |
| 5,206,468 A | * | 4/1993 | Kobayashi et al. | 200/50.23 |
| 5,623,135 A | | 4/1997 | Hashimoto et al. | |
| 7,881,044 B2 | * | 2/2011 | Jacobsen et al. | 361/608 |
| 8,570,121 B2 | * | 10/2013 | Sawada et al. | 335/6 |

FOREIGN PATENT DOCUMENTS

| | | |
|---|---|---|
| JP | 10-210611 | 8/1998 |
| JP | 11-164422 | 6/1999 |
| JP | 2006-59823 | 3/2006 |

* cited by examiner

← MOVABLE POSITION
← FIXED POSITION

INTERLOCK DEVICE OF DRAW-OUT TYPE CIRCUIT BREAKER, DRAW-OUT TYPE CIRCUIT BREAKER, AND POWER DISTRIBUTION BOARD

CLAIM OF PRIORITY

The present application claims priority from Japanese Patent application serial No. 2011-50897, filed on Mar. 9, 2011, the content of which is hereby incorporated by reference into this application.

TECHNICAL FIELD

The present invention relates to an interlock device of a draw-out type circuit breaker, the draw-out type circuit breaker, and a power distribution board and, more particularly, to an interlock device, of a draw-out type circuit breaker for closing and interrupting the current in an electric circuit, that is provided to fix the draw-out type circuit breaker at an appropriate position in a power distribution board and to prevent protrusion and incorrect drawing of the draw-out type circuit breaker when the draw-out type circuit breaker is placed in a closed state, the draw-out type circuit breaker, and the power distribution board.

BACKGROUND ART

In general, a draw-out type circuit breaker is connected in an electric circuit between a power supply and a load, and is a type of breaker used to allow a main circuit current to flow and shut it out. The draw-out type circuit breaker is used in a state in which it is accommodated and fixed in a power distribution board.

The draw-out type circuit breaker is substantially structured with a main contact that closes and opens a main circuit, a driving apparatus that drives the main contact, a main circuit energizing part that allows a main circuit current to flow, a connecting part that enables the main circuit energizing part in the draw-out type circuit breaker and a portion of the main circuit in the power distribution board to be removably connected to each other, a moving device that moves the draw-out type circuit breaker, an interlock device that fixes the draw-out type circuit breaker accommodated in the power distribution board at an appropriate position, and the like.

During an operation, the draw-out type circuit breaker is usually fixed by the interlock device at an operation position at which the main circuit portion in the power distribution board and the draw-out type circuit breaker are appropriately connected to each other by the connecting part.

Accordingly, the connecting part of the main circuit portion in the power distribution board and the draw-out type circuit breaker, the energizing part, and the main contact constitute the main circuit. When the main contact of the draw-out type circuit breaker is closed and opened, electric power is supplied from the power supply to the load or is shut out.

A conventional interlock device is described in PTL 1. The interlock device described in PTL 1 has an interlock rod, an interlock switch, a control circuit board, and the like. The interlock device is characterized in that the interlock switch forcibly shuts off a closing command to be input to the control circuit board according to the operation of the interlock rod.

CITATION LIST

Patent Literature

[PTL 1] Japanese Patent Laid-open No. 2006-59823

SUMMARY OF INVENTION

Technical Problem

If the draw-out type circuit breaker is moved from an operation position or is moved to the operation position with the draw-out type circuit breaker closed, an arc may be generated within the connecting part of the main circuit portion in the power distribution board and the draw-out type circuit breaker and thereby a device may be seriously damaged; in the worst case, a transformer station may suffer a fire.

Therefore, the following three points are very important: the draw-out type circuit breaker is firmly fixed at the operation position at which the main circuit portion in the power distribution board and the draw-out type circuit breaker are appropriately connected to each other by the connecting part and at a disconnected position at which a necessary insulated distance is secured within the connecting part of the main circuit portion in the power distribution board and the draw-out type circuit breaker, the draw-out type circuit breaker is always placed in an open state when the draw-out type circuit breaker is moved from the operation position and is moved to the operation position, and the draw-out type circuit breaker remains in the open state while the draw-out type circuit breaker is placed at a position other than the operation position and the disconnection position. It is necessary to meet these functions by using an interlock device.

If the interlock device does not meet these functions, the device damage and the fire in the transformer station described above may be led by vibration-caused protrusion of the draw-out type circuit breaker placed in the closed state or by incorrect drawing or incorrect insertion of the draw-out type circuit breaker placed in the closed state.

For the interlock device described in the PTL 1, however, the above points are not described at all.

The present invention addresses the above problem with the object of providing a draw-out type circuit breaker for closing and interrupting the current in an electric circuit that not only can be fixed at an appropriate position in a power distribution board but also can eliminate the potential of causing serious accidents such as device damage and a fire in a transformer station led by an arc caused by a vibration-caused protrusion of the draw-out type circuit breaker placed in the closed state or by incorrect drawing or incorrect insertion of the draw-out type circuit breaker placed in the closed state and also providing an interlock device for the draw-out type circuit breaker and a power distribution board.

Solution to Problem

An interlock device according to the present invention includes a tripping button that is linked to a tripping mechanism of a draw-out type circuit breaker, and an interlock rod that is placed so as to be movable up and down, wherein the tripping button mechanically prevents an operation to raise the interlock rod unless the tripping button is operated to place the draw-out type circuit breaker in the open state, so a power distribution board floor surface or a member fixed on the power distribution board floor surface and the interlock rod interfere with each other and the draw-out type circuit breaker is fixed at a predetermined position in the power distribution board.

In addition to the above structure, the interlock device according to the present invention is characterized in that when the interlock rod is placed at an upper position, the tripping button and the interlock rod mechanically interfere with each other, so the tripping button is kept in an operated state and thereby the draw-out type circuit breaker continues to be placed in an open state.

When the interlock rod interferes with the power distribution board floor surface or the member fixed on the power distribution board floor surface, the interlock rod can be placed in a lower position only when the draw-out type circuit breaker is placed at the operation position at which the main circuit portion in the power distribution board and the draw-out type circuit breaker are appropriately connected to each other by the connecting part, at the disconnected position at which a necessary insulated distance is secured within the connecting part of the main circuit portion in the power distribution board and the breaker, or at a position outside the power distribution board.

When the interlock rod is placed at the lower position with the power distribution board placed at the operation position or disconnected position, the draw-out type circuit breaker is fixed by the engagement between the interlock rod and the power distribution board floor surface or the member fixed on the power distribution board floor surface.

When the interlock rod is placed at the lower position, the manual tripping button can be freely operated because it does not mechanically interfere with the interlock rod, enabling the draw-out type circuit breaker to be electrically opened and closed and to be manually opened and closed.

To move the draw-out type circuit breaker from the operation position or disconnected position, the draw-out type circuit breaker must be unfixed by moving the interlock rod upward.

If the tripping button is not operated, however, interference between the tripping button and the interlock rod remains, preventing an operation to raise the interlock rod.

Accordingly, to move the draw-out type circuit breaker from the operation position or disconnected position, it is necessary to operate the tripping button to eliminate the interference between the tripping button and the interlock rod. This assures that the draw-out type circuit breaker is placed in the open state.

When the draw-out type circuit breaker is placed at a position other than the operation position and disconnected position, the interlock rod mechanically interferes with the power distribution board floor surface or the member fixed on the power distribution board floor surface, preventing an operation to lower the interlock rod. Therefore, the interlock rod remains at the upper position.

At that time, the tripping button and interlock rod interfere with each other, resulting in a state in which the tripping button is always operated, so the open state of the draw-out type circuit breaker continues. That is, when the draw-out type circuit breaker is placed at a position other than the operation position and disconnected position, the draw-out type circuit breaker is always in the open state.

With the interlock device described above, when the draw-out type circuit breaker is placed in the power distribution board, the draw-out type circuit breaker can be opened and closed only when the draw-out type circuit breaker is fixed by lowering the interlock rod with the draw-out type circuit breaker placed at the operation position or disconnected position. When the draw-out type circuit breaker is placed at a position other than the operation position and disconnected position, the draw-out type circuit breaker cannot be operated so as to be closed and opened; the draw-out type circuit breaker remains in the open state.

Advantageous Effects of Invention

According to the present invention, the draw-out type circuit breaker is reliably fixed at the operation position or disconnected position; when the draw-out type circuit breaker is moved from the operation position or is moved to the operation position, the draw-out type circuit breaker is always placed in the open state. When the draw-out type circuit breaker is placed at a position other than the operation position and disconnected position, the draw-out type circuit breaker remains in the open state.

Accordingly, it is possible not only to fix a draw-out type circuit breaker for closing and interrupting the current in an electric circuit at an appropriate position in the power distribution board but also to eliminate the potential of causing serious accidents such as device damage and a fire in a transformer station led by an arc caused by a vibration-caused protrusion of the draw-out type circuit breaker placed in the closed state or by incorrect drawing or incorrect insertion of the draw-out type circuit breaker placed in the closed state.

DESCRIPTION OF EMBODIMENTS

An embodiment of an inventive interlock device of a draw-out type circuit breaker will be described with reference to the drawings.

Figure 1:
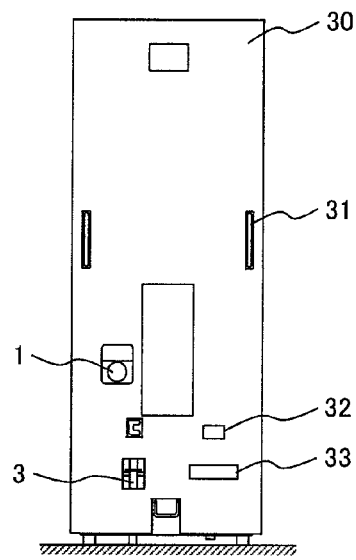
FIG. 1 is a front view of a draw-out type circuit breaker in which an interlock device according to an example of the present invention is included.
Figure 2:
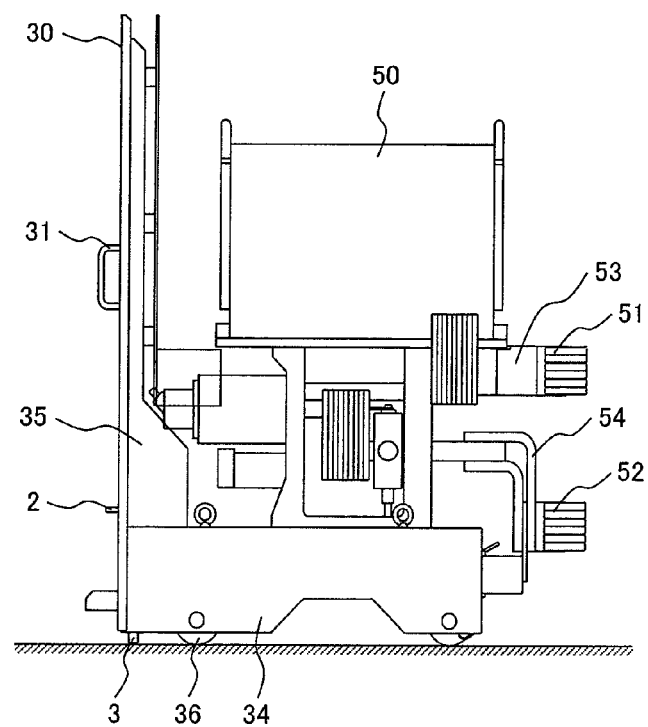
FIG. 2 is a side view of the draw-out type circuit breaker in which the interlock device according to the example of the present invention is included.

FIGS. 1 and 2 show a draw-out type circuit breaker in which an interlock device according to an example of the present invention is mounted.

The draw-out type circuit breaker in these drawings has a fixed circuit breaker 50, which includes a main contact and a driving unit, provided with an upper main circuit conductor 53 and a lower main circuit conductor 54. An upper main circuit terminal 51 and a lower main circuit terminal 52, which are used for a connection to a main circuit portion in a power distribution board, are respectively connected to the upper main circuit conductor 53 and the lower main circuit conductor 54.

The fixed circuit breaker 50 is fixed to a cart 34, having wheels 36, which is a moving device. This enables the draw-out type circuit breaker to be drawable. A frame 35 is attached to the cart 34, and a front panel 30 is secured to the frame 35 with bolts, nuts, and other fastening means.

A manual tripping button 1, an interlock pin 2, an interlock rod 3, a moving handle 31, a counter 32, and a control plug 33 are placed on the front of the draw-out type circuit breaker.

Figure 3:
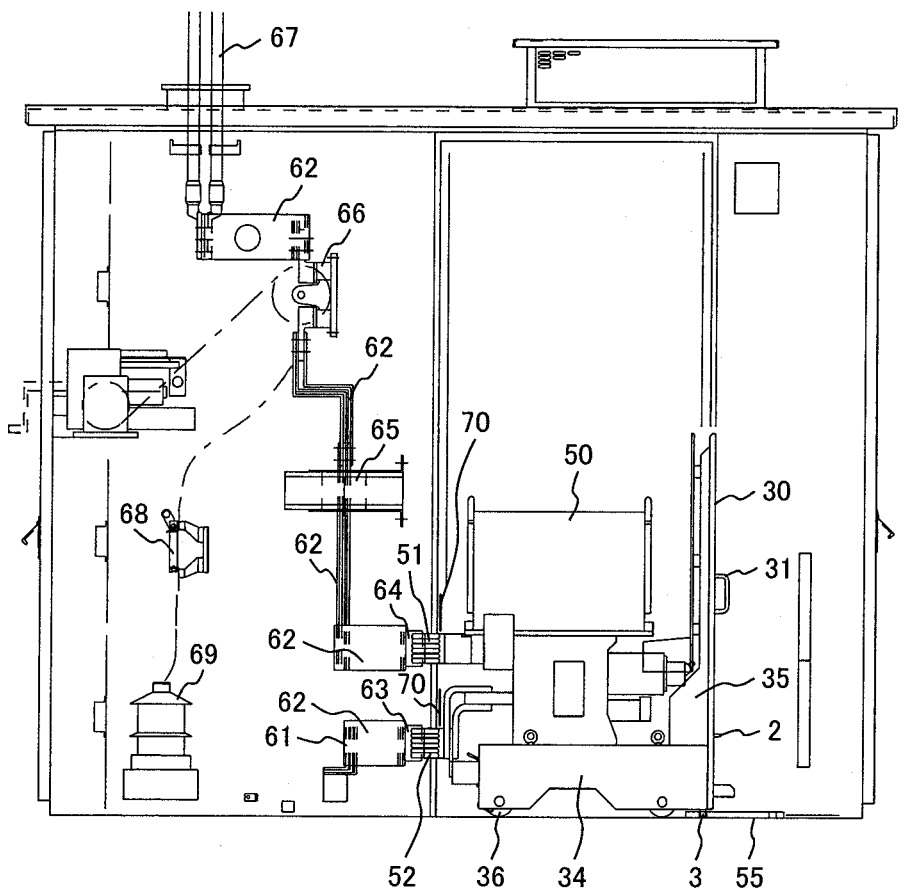
FIG. 3 is a side view of a power distribution board in which the draw-out type circuit breaker including the interlock device according the example of the present invention is fixed at an operation position.

FIG. 3 shows the power distribution board in which the draw-out type circuit breaker is fixed at an operation position.

In the drawing, the operation position is a position at which the main circuit portion in the power distribution board and the draw-out type circuit breaker are connected to each other by the connecting part and the draw-out type circuit breaker allows a current to appropriately flow into the main circuit.

When the draw-out type circuit breaker, which is drawable, is fixed at the operation position in the power distribution board, an upper main circuit terminal connecting part 64 of the power distribution board and the upper main circuit terminal 51 of the draw-out type circuit breaker are electrically connected to each other and a lower main circuit terminal connecting part 63 of the power distribution board and the lower main circuit terminal 52 of the draw-out type circuit breaker are electrically connected to each other. When the draw-out type circuit breaker is then operated so as to be closed and opened, a current can be supplied to the main circuit, which is structured with a main circuit bus 61, a main circuit conductor 62, the lower main circuit terminal connecting part 63, the draw-out type circuit breaker, the upper main circuit terminal connecting part 64, an electric disconnector 66, and a main circuit cable 67, and the current to the main circuit can be shut out.

A lightning arrester 69, which is intended to protect the main circuit from an overvoltage such as a lightning surge, is electrically connected to the main circuit through a manual disconnector 68. A AI-type current transformer 65, which is intended to protect the main circuit from a ground fault and short-circuit, is attached to the main circuit conductor 62.

Figure 4:
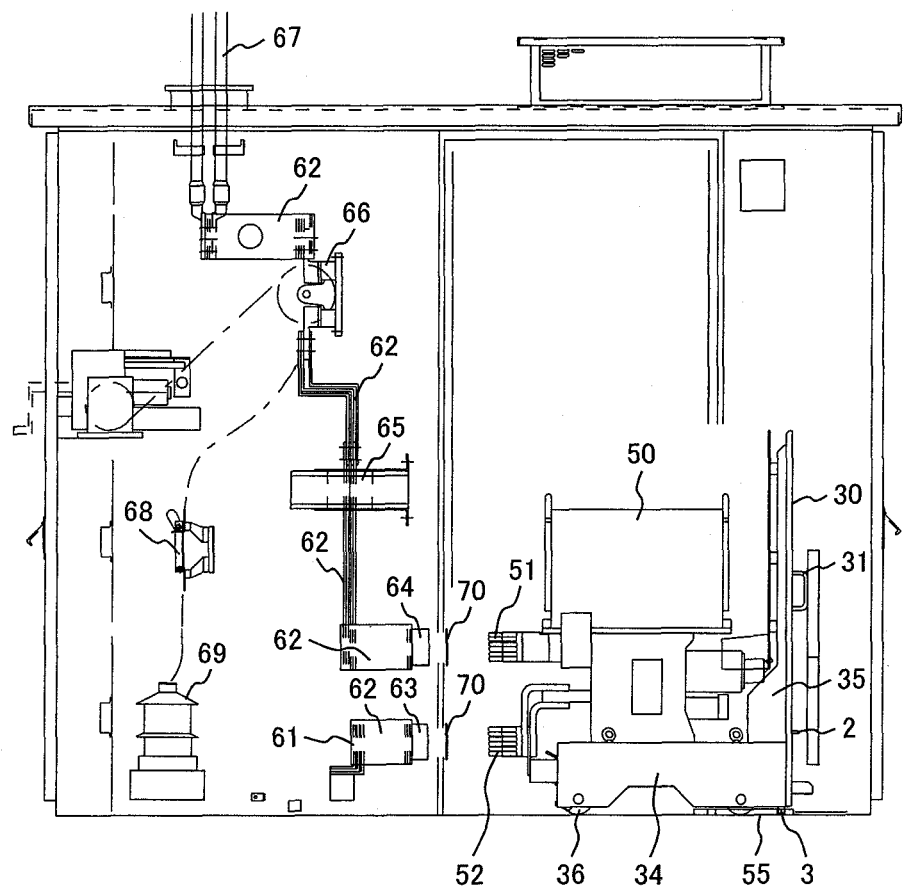
FIG. 4 is a side view of a power distribution board in which the draw-out type circuit breaker including the interlock device according to the example of the present invention is fixed at a disconnected position.

FIG. 4 shows the power distribution board in which the draw-out type circuit breaker is fixed at the disconnected position.

In the drawing, the disconnected position is a position at which the draw-out type circuit breaker is placed with a necessary insulated distance secured between the main circuit portion in the power distribution board and the draw-out type circuit breaker.

When the draw-out type circuit breaker, which is drawable, is fixed at the disconnected position, the upper main circuit terminal 51 of the draw-out type circuit breaker is disconnected from the upper main circuit terminal connecting part 64 of the power distribution board and is electrically isolated, and the lower main circuit terminal 52 of the draw-out type circuit breaker is disconnected from the lower main circuit terminal connecting part 63 of the power distribution board and is electrically isolated. Accordingly, a current does not flow into the main circuit described above regardless of whether the draw-out type circuit breaker is in the open or closed state.

A spacing between the upper main circuit terminal connecting part 64 and the upper main circuit terminal 51 is closed by a shutter 70, and a spacing between the lower main circuit terminal connecting part 63 and the lower main circuit terminal 52 is also closed by another shutter 70, preventing energized parts from being exposed and thereby preventing a person from touching the energized parts.

Accordingly, the draw-out type circuit breaker is fixed at the disconnected position during inspection of the breaker or power distribution board or after the completion of a regular operation.

Figure 5:
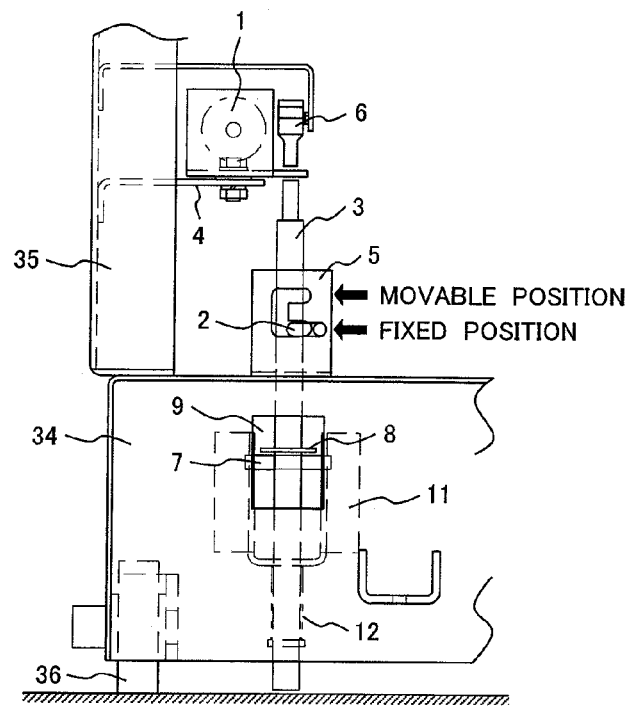
FIG. 5 is a front view of the interlock device when an interlock pin in the interlock device according to the example of the present invention is placed at a fixed position.
Figure 6:
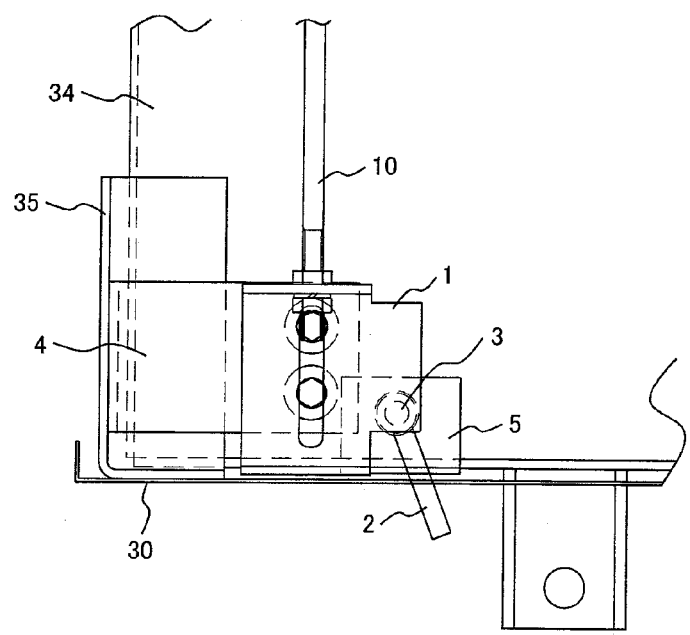
FIG. 6 is a plan view of the interlock device when an interlock pin in the interlock device according to the example of the present invention is placed at the fixed position.
Figure 7:
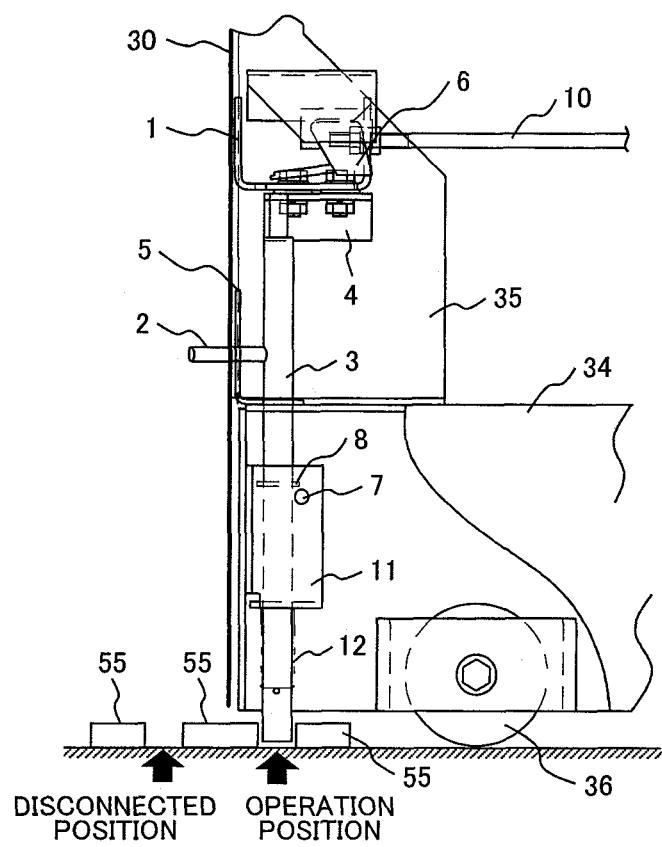
FIG. 7 is a side view of the interlock device when the interlock pin in the interlock device according to the example of the present invention is placed at the fixed position.

FIGS. 5 to 7 show an embodiment of the interlock device according to the present invention. In the interlock device in FIGS. 5 to 7, the interlock pin 2 is placed at the fixed position, described later, of the draw-out type circuit breaker.

As shown in these drawings, the manual tripping button 1 is mechanically linked to a manual tripping rod 10, which is linked to a manual tripping mechanism of the fixed circuit breaker 50. When the manual tripping button 1 is pressed from the front, the manual tripping rod 10 operates the manual tripping mechanism of the fixed circuit breaker 50, placing the breaker in the open state.

When the interlock pin 2, which is attached to the interlock rod 3, moves in the interior of a U-shaped hole (the U-shaped hole can be seen from the outside) formed at the center of the front of an interlock pin fixture 5, which is fixed to the cart 34, the interlock pin 2 can be moved to the movable position or fixed position in the draw-out type circuit breaker.

The interlock rod 3, which is a round rod, passes through round holes formed in the interlock pin fixture 5, the cart 34, and an interlock rod fixing fixture 11. The interlock rod 3 does not move fore and aft and side to side, but can be moved up and down and can be rotated. However, the movable range of the interlock rod 3 is limited by interference between the U-shaped hole at the center of the front of the interlock pin fixture 5 and the interlock pin 2 and by interference between the interlock rod 3 and the manual tripping button 1.

When the interlock pin 2 is moved in the interior of the U-shaped hole at the center of the front of the interlock pin fixture 5 and is set at the movable position, the interlock rod 3 is placed at an upper position. When the interlock pin 2 moves in the interior of the U-shaped hole at the center of the front of the interlock pin fixture 5 and is set at the fixed position, the interlock rod 3 is placed at a lower position.

When the draw-out type circuit breaker is placed at the operation position or disconnected position and the interlock pin 2 is set at the fixed position, the lower end of the interlock rod 3 enters a spacing formed between a plurality of breaker fixing fixtures 55 attached to the draw-out type circuit breaker floor. Accordingly, the breaker fixing fixtures 55 and the lower end of the interlock rod 3 interfere with each other. Therefore, the draw-out type circuit breaker cannot be moved from the operation position or disconnected position, so the draw-out type circuit breaker is fixed.

When the interlock pin 2 is moved in the interior of the U-shaped hole formed at the center of the front of the interlock pin fixture 5 and is set at the fixed position, the interlock rod 3 is placed at a position below the manual tripping button 1. Therefore, the manual tripping button 1 and interlock rod 3 do not interfere with each other, enabling the manual tripping button 1 to be freely operated.

Figure 8:
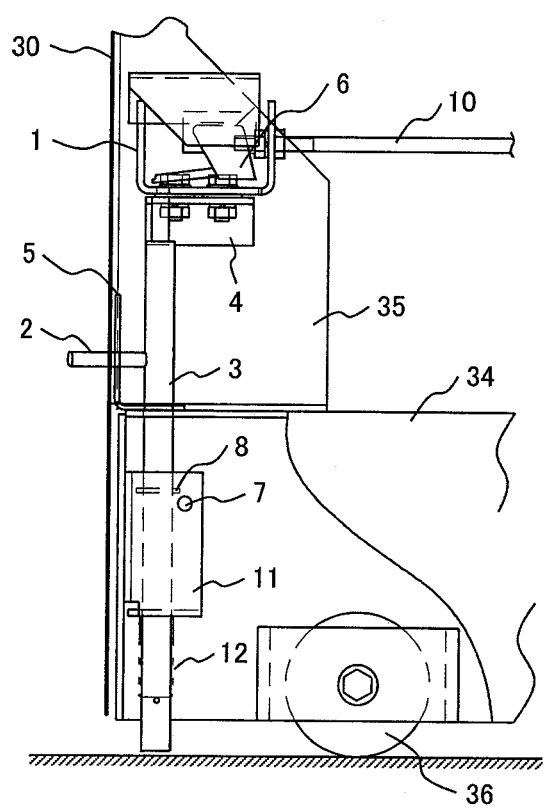
FIG. 8 is a side view of the interlock device when the interlock pin in the interlock device according to the example of the present invention is placed at the fixed position and a manual tripping button is operated.

FIG. 8 shows the interlock device in a state in which the manual tripping button 1 is operated.

In a state in which the interlock pin 2 is set at the fixed position and the manual tripping button 1 is not operated, the interlock rod 3 and manual tripping button 1 interfere with each other, preventing an operation to raise the interlock rod 3.

To set the interlock pin 2 at the movable position, that is, to enable the operation to raise the interlock rod 3, it is necessary to press the manual tripping button 1 from the front to prevent interference between the manual tripping button 1 and the interlock rod 3.

Since the manual tripping button 1 is operated at that time, moving the draw-out type circuit breaker always requires an open operation.

To insert the draw-out type circuit breaker into the operation position or pull out of the operation position, an in/out handle must be inserted into an in/out handle insertion port 9 and the in/out handle must be hooked into an in/out handle fixture 7.

When the interlock pin 2 is set at the fixed position, the in/out handle interferes with a fixture 8 attached to the interlock rod 3, preventing the in/out handle from being hooked into an in/out handle fixture 7. Therefore, it becomes impossible to insert the draw-out type circuit breaker into the operation position and to draw the draw-out type circuit breaker from the operation position.

Figure 9:
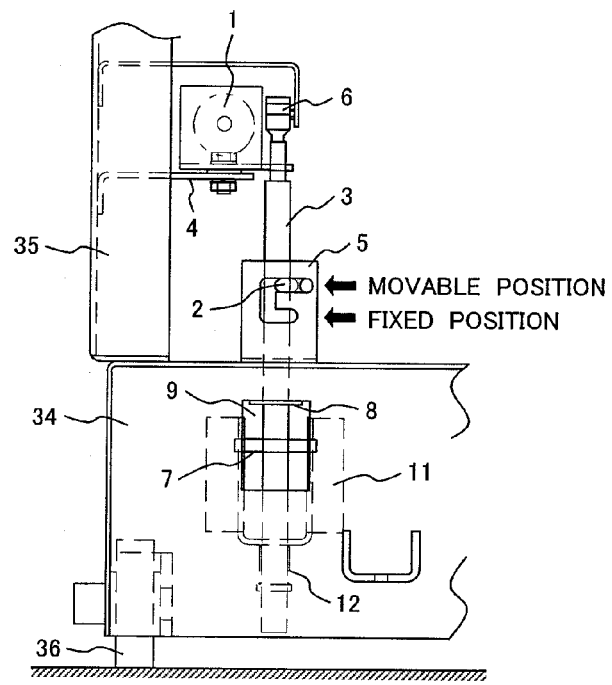
FIG. 9 is a front view of the interlock device when an interlock pin in the interlock device according to the example of the present invention is placed at a movable position.
Figure 10:
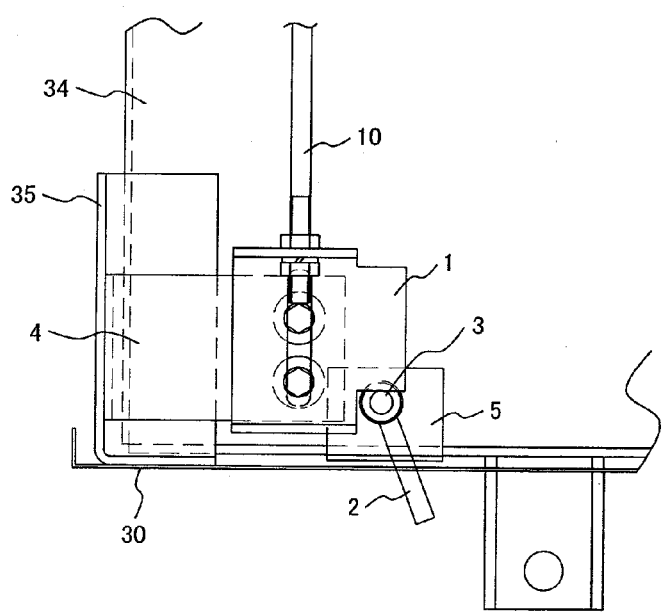
FIG. 10 is a plan view of the interlock device when an interlock pin in the interlock device according to the example of the present invention is placed at the movable position.
Figure 11:
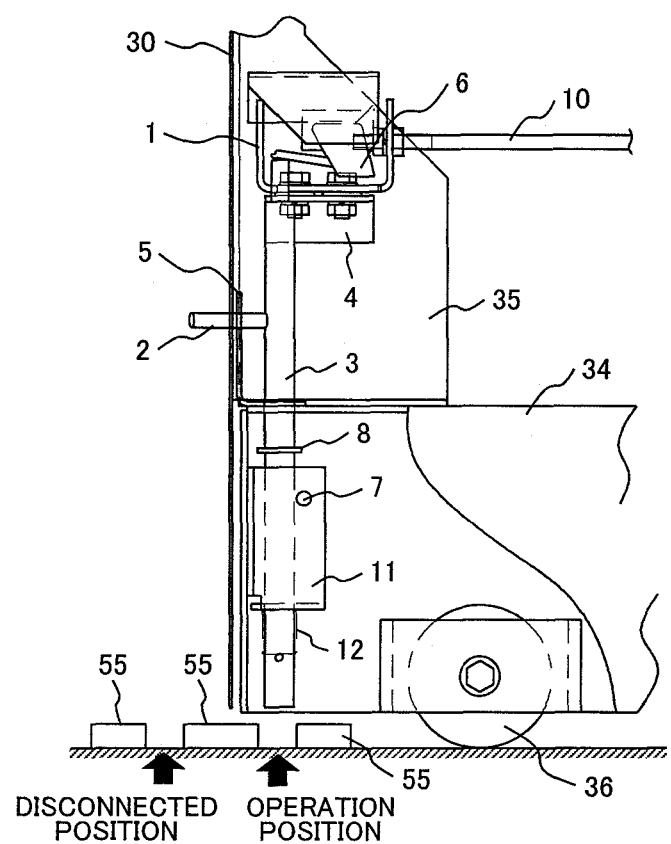
FIG. 11 is a side view of the interlock device when an interlock pin in the interlock device according to the example of the present invention is placed at the movable position.

FIGS. 9 to 11 show the interlock device in a case in which the interlock pin 2 is set at the movable position in the draw-out type circuit breaker.

When, as shown in these drawings, the interlock pin 2 is moved in the interior of the U-shaped hole at the center of the front of the interlock pin fixture 5 and is set at the movable position, the interlock rod 3 is placed at an upper position.

When the draw-out type circuit breaker is placed at a position other than the operation position and disconnected position, the interlock pin 2 cannot be set at the fixed position due the interference between the breaker fixing fixture 55 and the interlock rod 3.

In this state, that is, in a state in which the interlock pin 2 is set at the movable position, the manual tripping button 1 interferes with the interlock rod 3, so the manual tripping button 1 remains in a pressed state. That is, a manual trip command is given to the manual tripping mechanism of the fixed circuit breaker 50, so the draw-out type circuit breaker remains in the open state.

In a state in which the interlock pin 2 is set at the movable position, there is no interference between the interlock rod 3 and the breaker fixing fixture 55 mounted on the power distribution board floor, so the draw-out type circuit breaker can be freely moved.

With the interlock pin 2 set at the fixed position, it has been impossible to hook the in/out handle into the in/out handle fixture 7 as described above. When the interlock pin 2 is set at the movable position, however, the fixture 8 attached to the interlock rod 3 is also moved upward together with the interlock rod 3. Therefore, interference does not occur between the in/out handle and the fixture 8, so it is possible to insert the draw-out type circuit breaker into the operation position and to draw the draw-out type circuit breaker from the operation position.

As described above, when the draw-out type circuit breaker is placed in the power distribution board, the draw-out type circuit breaker is reliably fixed at the operation position or disconnected position; when the draw-out type circuit breaker is moved from the operation position or is moved to the operation position, the draw-out type circuit breaker is always placed in the open state.

When the draw-out type circuit breaker is placed at a position other than the operation position and disconnected position, open and closing operations are disabled and the draw-out type circuit breaker remains in the open state.

Accordingly, it is possible not only to fix a draw-out type circuit breaker for closing and interrupting the current in an electric circuit at an appropriate position in the power distribution board but also to eliminate the potential of causing serious accidents such as device damage and a fire in a transformer station led by an arc caused by a vibration-caused protrusion of the draw-out type circuit breaker placed in the closed state or by incorrect drawing or incorrect insertion of the draw-out type circuit breaker placed in the closed state.

REFERENCE SIGNS LIST

1 manual tripping button
2 interlock pin
3 interlock rod
4 fixture
5 interlock pin fixture
6 limit switch
7 in/out handle fixture
8 fixture
9 in/out handle insertion port
10 manual tripping rod
11 interlock rod fixing fixture
12 spring
30 front panel
31 moving handle
32 counter
33 control plug
34 cart
35 frame
36 wheel
50 fixed circuit breaker
51 upper main circuit terminal
52 lower main circuit terminal
53 upper main circuit conductor
54 lower main circuit conductor
55 breaker fixing fixture
61 main circuit bus
62 main circuit conductor
63 lower main circuit terminal connecting part
64 upper main circuit terminal connecting part
65 ΔI-type current transformer
66 electric disconnector
67 main circuit cable
68 manual disconnector
69 lightning conductor
70 shutter

The invention claimed is:

1. An interlock device of a draw-out type circuit breaker, comprising:
   a tripping button that is linked to a tripping mechanism of the draw-out type circuit breaker;
   an interlock rod that is placed so as to be movable up and down;
   wherein the tripping button mechanically prevents an operation to raise the interlock rod unless the tripping button is operated to place the draw-out type circuit breaker in an open state, so a power distribution board floor surface or a member fixed on the power distribution board floor surface and the interlock rod mechanically interfere with each other and the draw-out type circuit breaker is fixed at a predetermined position in the power distribution board; and wherein when the interlock rod interferes with the power distribution board floor surface or the member fixed on the power distribution board floor surface, the interlock rod is placed in a lower position only when the draw-out type circuit breaker is placed at an operation position at which a main circuit portion in the power distribution board and the draw-out type circuit breaker are connected to each other by a connecting part of them, at a disconnected position at which a necessary insulated distance is secured within the connecting part of the main circuit portion in the power distribution board and the draw-out type circuit breaker, or at a position outside the power distribution board.

2. The interlock device of a draw-out type circuit breaker according to claim 1, wherein when the interlock rod is placed at the lower position, the tripping button does not mechanically interfere with the interlock rod.

3. A draw-out type circuit breaker having the interlock device, comprising:
a tripping button that is linked to a tripping mechanism of the draw-out type circuit breaker;
an interlock rod that is placed so as to be movable up and down;
a main contact that closes and opens a main circuit;
a driving unit that drives the main contact;
a main circuit energizing part that allows a main circuit current to flow;
a connecting part that enables the main circuit energizing part and the main circuit portion in a power distribution board to be removably connected to each other; and
a moving device that moves the draw-out type circuit breaker;
wherein the tripping button mechanically prevents an operation to raise the interlock rod unless the tripping button is operated to place the draw-out type circuit breaker in an open state, so a power distribution board floor surface or a member fixed on the power distribution board floor surface and the interlock rod mechanically interfere with each other and the draw-out type circuit breaker is fixed at a predetermined position in the power distribution board; and
wherein the interlock device fixes the draw-out type circuit breaker accommodated in the power distribution board at a predetermined position.

4. A draw-out type circuit breaker having the interlock device, comprising:
a tripping button that is linked to a tripping mechanism of the draw-out type circuit breaker;
an interlock rod that is placed so as to be movable up and down;
a main contact that closes and opens a main circuit;
a driving unit that drives the main contact;
a main circuit energizing part that allows a main circuit current to flow;
a connecting part that enables the main circuit energizing part and the main circuit portion in a power distribution board to be removably connected to each other; and
a moving device that moves the draw-out type circuit breaker;
wherein the tripping button mechanically prevents an operation to raise the interlock rod unless the tripping button is operated to place the draw-out type circuit breaker in an open state, so a power distribution board floor surface or a member fixed on the power distribution board floor surface and the interlock rod mechanically interfere with each other and the draw-out type circuit breaker is fixed at a predetermined position in the power distribution board;
wherein the interlock rod has an interlock pin, which is integrally formed with the interlock rod, by which the interlock rod is moved to a fixed position or a movable position for the draw-out type circuit breaker; and
wherein the interlock device fixes the draw-out type circuit breaker accommodated in the power distribution board at a predetermined position, and the tripping button, the interlock rod, and the interlock pin are placed on the front of the draw-out type circuit breaker.

5. The draw-out type circuit breaker according to claim 4, wherein when the interlock pin moves in a U-shaped hole formed in a front of an interlock pin fixture, which is fixed to the moving device, the interlock pin moves to the movable position and the fixed position in the draw-out type circuit breaker.

6. A power distribution board having the draw-out type circuit breaker according to claim 3, comprising: a main circuit cable, a main circuit conductor, a main circuit bus, and a main circuit terminal connecting part, which are placed in the board, wherein the draw-out type circuit breaker is accommodated in the board, is electrically connected to the main circuit terminal connecting part so as to be detachable, and is movable to the operation position and the disconnected position.

7. The power distribution board according to claim 6, comprising a shutter that covers a spacing formed between the main circuit terminal connecting part and a connecting terminal of the draw-out type circuit breaker when an electrical connection between the main circuit terminal connecting part and the connecting terminal of the draw-out type circuit breaker is disconnected.

* * * * *